United States Patent [19]

Seawright

[11] Patent Number: 4,696,554
[45] Date of Patent: Sep. 29, 1987

[54] METHOD AND APPARATUS FOR PROVIDING A VARIABLE MULTIPLE IMAGE VISUAL EFFECT

[76] Inventor: James Seawright, 155 Wooster St., New York, N.Y. 10012

[21] Appl. No.: 750,687

[22] Filed: Jun. 28, 1985

[51] Int. Cl.⁴ .................. G02B 5/08; G02B 5/10; G02B 5/124; G02B 7/18
[52] U.S. Cl. .................. 350/613; 350/614; 350/611
[58] Field of Search ............ 350/611, 612, 613, 614, 350/617, 619, 622, 623, 624, 625–627, 631–636

[56] References Cited

U.S. PATENT DOCUMENTS

| | | |
|---|---|---|
| 412,724 | 10/1889 | Calver .................. 350/611 X |
| 569,503 | 10/1896 | Keyes . |
| 1,794,142 | 8/1927 | Boston . |
| 3,469,837 | 9/1969 | Heilig . |
| 3,528,730 | 9/1970 | Saxon .................. 350/613 X |
| 3,620,606 | 11/1971 | Tschunko .................. 350/611 |
| 3,748,982 | 7/1973 | Ries . |
| 4,110,010 | 8/1978 | Hilton . |
| 4,218,114 | 8/1980 | Bunch . |
| 4,395,581 | 7/1983 | Girard . |

*Primary Examiner*—Donald Watkins
*Attorney, Agent, or Firm*—Stiefel, Gross, Kurland & Pavane

[57] ABSTRACT

A method and apparatus for providing a variable multiple image visual effect employing either plurality of angled planar specular reflective surfaces in a pseudo spherical optical array.

33 Claims, 11 Drawing Figures

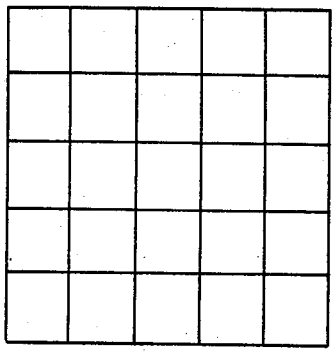
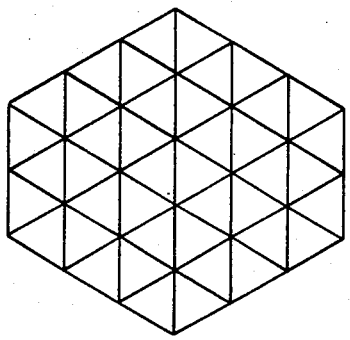
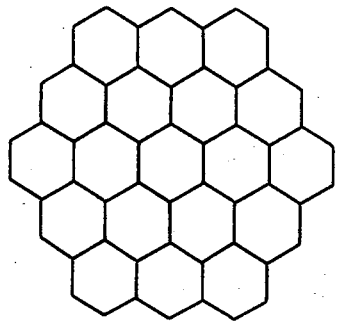
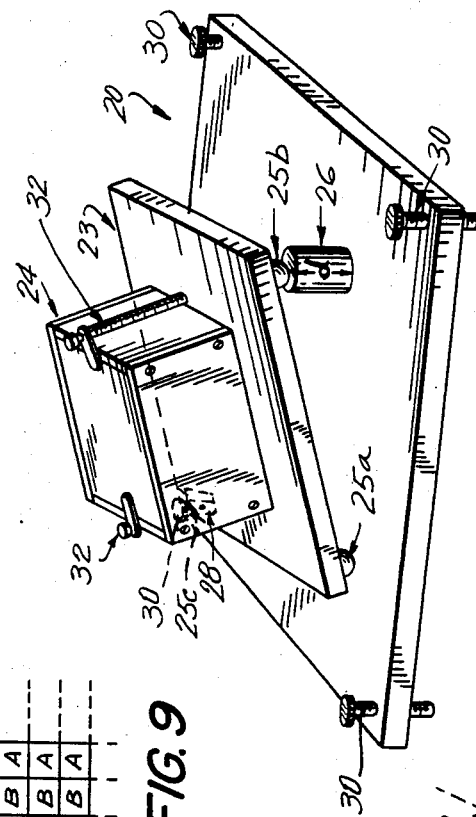
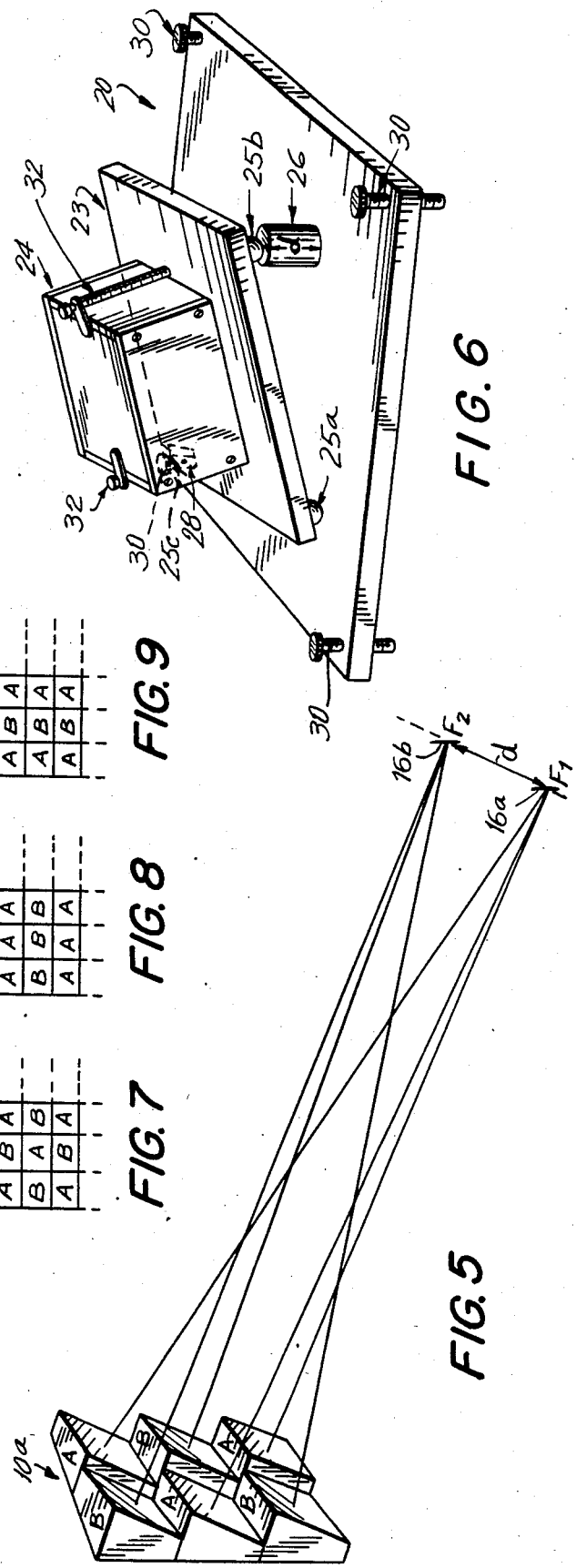

METHOD AND APPARATUS FOR PROVIDING A VARIABLE MULTIPLE IMAGE VISUAL EFFECT

TECHNICAL FIELD

The present invention relates to methods and apparatus for providing visual effects from reflected images, and particularly to methods and apparatus for providing variable multiple image visual effects.

BACKGROUND ART

Various display devices for providing a plurality of reflected images are well known in the art, such as the reflecting screen disclosed in U.S. Pat. No. 569,503; the adjustable posing apparatus disclosed in U.S. Pat. No. 1,794,142; the surveillance mirror system disclosed in U.S. Pat. No. 3,748,982; and the projection screen disclosed in the experience theatre of U.S. Pat. No. 3,469,837. None of the prior art known to applicant, however, discloses a method or apparatus capable of providing a variable multi-image visual effect from a plurality of angled planar specular reflective surfaces arranged in a pseudo spherical optical array having one or more focal points disposed along an axis so as to provide progressively shifted multiple images of an object as the object shifts through the focal points along this axis. In addition, none of the prior art known to applicant readily enables images to be mingled together in such a multiple focal point array. For example, the system disclosed in U.S. Pat. No. 3,469,837 is designed to obtain a coherent single image as opposed to multiple images of the same thing or progressively shifted images, neither of which would be acceptable in such a prior art system since the intent is to provide a movie screen type of effect as opposed to a variable multiple image visual effect, such as obtainable with the method and apparatus of the present invention.

DISCLOSURE OF THE INVENTION

A method and apparatus for providing variable multiple image visual effects comprises disposing a first plurality of angled planar specular reflective surfaces in a pseudo spherical optical array having an array center and a first common center of curvature associated with the first plurality of reflective surfaces, with the reflective surfaces being tilted from a common plane at a plurality of predetermined angles in order to provide a common focal point for the plurality of reflective surfaces in the pseudo spherical optical array at the center of curvature. The position of any one of the given specular reflective surfaces in the array is defined by the linear x,y orthogonal translation of the planar reflective surface center from the array center in the common plane. Each of the specular reflective surfaces has a center disposed normal to a radius emanating from the first common center of curvature whereby each of the planar specular reflective surfaces is disposed tangent to the pseudo spherical optical array pseudo spherical surface. An object which is variably disposed along an axis extending through the focal point such as orthogonally with respect to the array center, is reflected in the array to provide progressively shifted multiple images from this object as the object shifts orthogonally from the focal point along the axis, the array thus providing a pair of orthogonally displaced conjugate foci for the orthogonally shifted object. The focal point is substantially disposed at the height of the array center with the array center being substantially disposed at eye level. Multiple focal points may be provided in the array by interspersing a second plurality of planar reflective surfaces in the array so as to provide a second common center of curvature orthogonally displaced in the plane from the first common center of curvature, such as vertically or horizontally, and disposed for providing a different focal point for the array at each of the centers of curvature. The interspersing of the reflective surfaces may be in a checkerboard type pattern, a horizontal stripe type pattern, or a vertical stripe type pattern, by way of example, so as to provide different types of visual effects. In this regard, the reflective surfaces themselves may be hexagonal shaped, triangular shaped or rectangular shaped by way of example. The use of multiple focal points for an array permits two different things to be mingled together in the variable multiple image visual effect observed in the array.

BRIEF DESCRIPTION OF THE DRAWINGS

FIGS. 4a through 4c are partial front elevational views of different reflective surface configurations for the apparatus of FIG. 1, with FIG. 4a illustrating a hexagonal reflective surface; FIG. 4b illustrating a triangular reflective surface; and FIG. 4c illustrating a rectangular reflective surface;

FIG. 5 is a fragmentary perspective view, partially diagramatic, similar to FIG. 3, illustrating a multiple focal point arrangement in accordance with the method and apparatus of the present invention;

FIG. 6 is a perspective view of a typical apparatus for casting mounting blocks for supporting the reflective surfaces in the apparatus of FIG. 1; and FIGS. 7 through 9 are partial diagramatic illustrations similar to FIG. 5, of alternative embodiments of interspersed reflective surfaces for providing different multiple focal point arrangements.

BEST MODE FOR CARRYING OUT THE INVENTION

Figure 3:
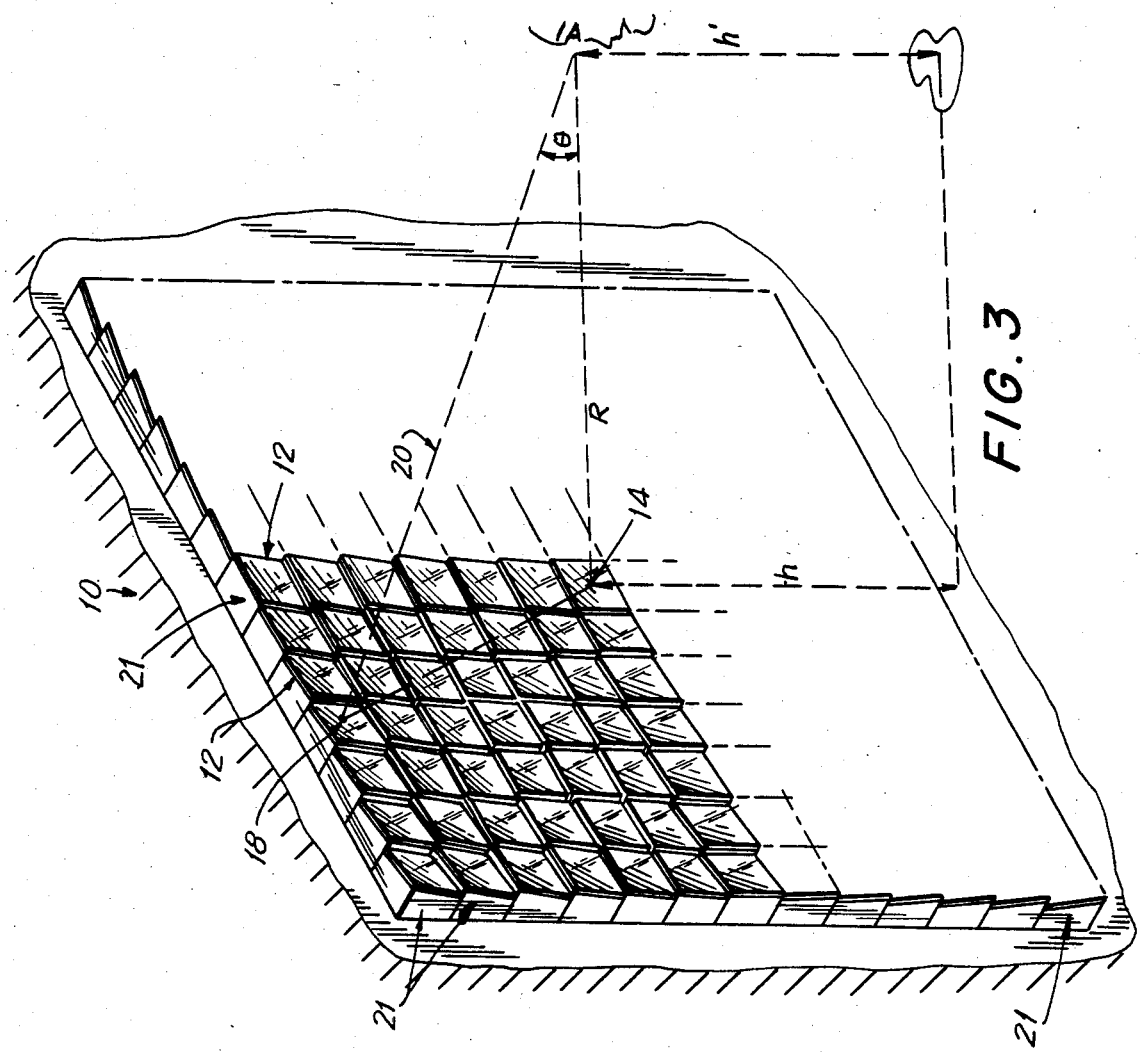
FIG. 3 is a fragmentary perspective view, partially diagrammatic, of the apparatus of FIG. 1, illustrating the principles of the method and apparatus of the present invention for a single focal point embodiment.
Figure 1:
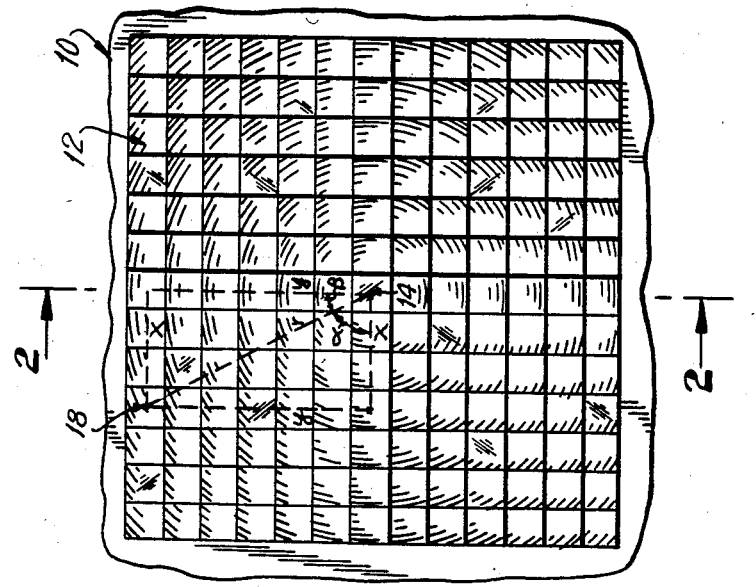
FIG. 1 is a front elevation view of a typical multiple image reflective device capable of providing a pseudo optical spherical array in accordance with the method and apparatus of the present invention.

Referring now to the drawings in detail and initally to FIGS. 1 through 3 and 6, an apparatus for providing a variable multiple image visual effect in accordance with the presently preferred method and apparatus of the present invention, generally referred to by the reference numeral 10, is shown. As shown and preferred in FIGS. 1, 2, and 3, the apparatus 10 of the present invention, preferably comprises an array of angled planar specular reflective surfaces or mirrors 12, which are illustrated as being rectangular in FIGS. 1, 2 and 3, as well as in FIG. 4c, although they can be other shapes such as the hexagonal shapes illustrated in FIG. 4a or the triangular shape illustrated in FIG. 4b if desired without departing from the spirit and scope of the present invention. As shown and preferred in FIGS. 1 through 3, the angled planar specular reflective surfaces 12 are arranged in a pseudo spherical optical array having an array center 14 and a common center of curvature 16 associated with the plurality of reflective surfaces 12. As further shown and preferred in FIGS. 1 through 3, the pseudo spherical optical array provided by the plurality of planar reflective surfaces 12 has a focal point disposed at the common center of curvature 16, with the focal point 16 being disposed at the height of the array center 14 which, in turn, as illustrated in FIG. 3, is preferably disposed at eye level for providing a multiple image spherical reflector visual effect capable of providing multiple progressively related reflected visual images of an object in the array as the object is shifted orthogonally, such as laterally, from the focal point 16 along an orthogonal axis extending through the focal point 16. Each of these specular reflective surfaces preferably has a center 18 disposed normal to a radius 20 emanating from the common center of curvature 16 whereby each of the planar specular reflective surfaces 12 is disposed tangent to the pseudo spherical optical array pseudo spherical surface.

Preferably, each of the reflective surfaces 12 is mounted in the array on a mounting block 21 which is cast from a moulding material, such as plaster or hydraulic cement, to the desired angle by means of a casting apparatus 20, such as shown in FIG. 6. The casting apparatus 20 of FIG. 6 preferably comprises a base plate 22 which may be accurately leveled by means of leveling screws 30 located at the corners, and a tilt plate 23 having ball shaped feet 25a, 25b, 25c at three corners which may be tilted by means of diametrically opposed tilt blocks 26 and 28 located at opposite corners of the tilt plate 23. A box shaped mold 24, which can preferably be disassembled, is mounted on the tilt plate 23 by means of conventional clamps 32. In order to cast the mounting block 21, a predetermined quantity of plaster or other hydraulic cement, which is preferably the same for all mounting blocks 21 in the array, is poured into the mold 24, which is preferably pretreated with a separating agent, and allowed to set. Thereafter, the mold 24 is disassembled and the cast block 21 is removed. The planar reflective surface 12 is then cemented to the angled surface 21a of the cast block 21 to provide the angled reflective surface 12 when the flat back surface 21b of the casting block 21 is mounted on a planar surface, such as a wall, to form the array. Preferably the correct angle for the surface 21a being cast, and hence, for the mounted reflective surface 12 thereon, is determined based on a geometric relationship of orthogonal or x,y linear translation from the array center as illustrated in FIGS. 2, 3 and 6 for a typical mounted reflective surface 12a having an angled surface 21a and a flat back surface 21b.

Figure 2:
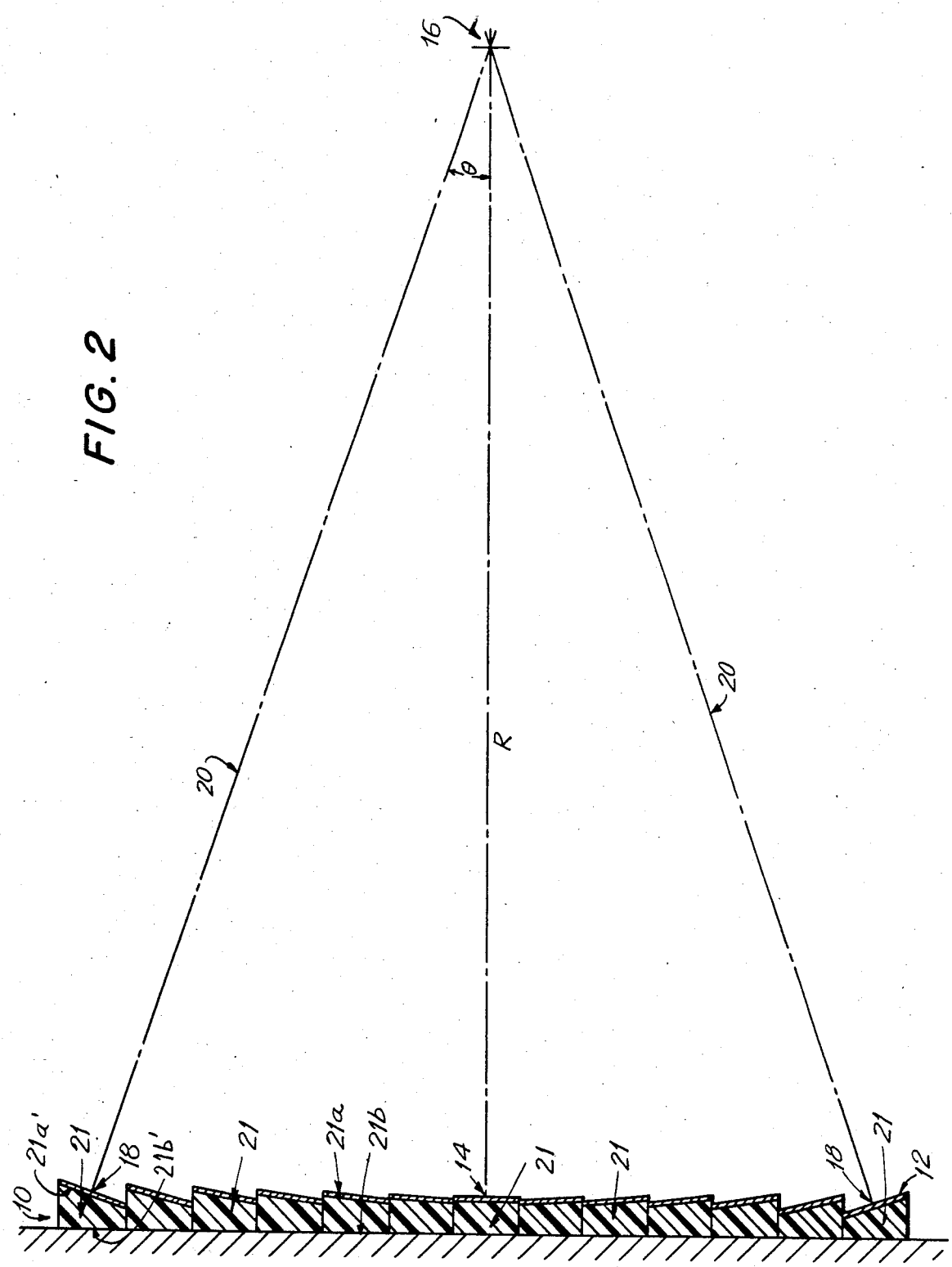
FIG. 2 is a fragmentary sectional view taken along line 2—2 of FIG. 1.

As shown and preferred in FIGS. 2, 3, and 6, the radius of curvature "R" which is the distance between the array center 14 and the focal point 16, is typically 10 feet to 15 feet depending on the size of the array. In addition, as further illustrated in FIGS. 1 and 3, the viewing angle $\theta$ between the array center 14 and the center 18 of any typical given reflective surface 12a in the array is defined by the expression $\theta = \tan^{-1} r/R$ where "r" is defined by the expression $r = \sqrt{x^2 + y^2}$, with x being the horizontal axis linear or orthogonal translation from the array center 14 illustrated in FIG. 1 and with y being the vertical x axis linear or orthogonal translation from the array center 14 also illustrated in FIG. 1. Preferably, the height of the focal point 16, represented by the symbol h is the same as the height from the floor of the array center 14 represented by the symbol h and is preferably eye height which is approximately 60 inches for an average adult. When the observer or an object is located at the focal point 16, multiple reflections are visible from any vantage point in front of the array with the observer or object being in every mirror when the object is located at the focal point 16. If, however, the object or the observer, orthogonally shifts from the focal point, such as horizontally in the +X or the −X direction, or vertically in the +y or −y direction, then progressively shifted images of the object or the observer appear in the array, with the array providing a pair of orthogonally displaced conjugate foci for the orthogonally shifted object, and with the pair of conjugate foci being symetrically displaced from the focal point along the axis in which the shifting occurs.

It should be noted, such as shown in FIGS. 2 and 3, preferably the cast blocks 21 for each of the reflective surfaces have their back surfaces 21b mounted in the array in a common plane which enables everything to be referenced to a flat surface in that the tilt or angle may then be determined by an x and y translation from a reference point. The distance "d" which determines the necessary tilt to establish the proper angle of inclination, $\theta$, of the tilt plate 23, in the plane of r and R is defined as 10 sin $\theta$ (in inches) for the case where the ball-shaped feet 25a, 25b and 25c are located at three of the corners of a square having sides exactly 10 inches long. This greatly simplifies the method of construction of the apparatus 10 of the present invention. In addition, with respect to the orthogonal tilt of the tilt plate 23 to define the angle of the surface 21a to which the reflective surface 12 is ultimately mounted, the x axis translation dx of tilt block 28 is defined by the expression dx = d cos A and the y axis translation of tilt block 26 is defined by the expression dy = d cos B, where A = −tan$^{-1}$ y/x and B = tan$^{-1}$ y/x as illustrated in FIG. 2.

Referring now to FIGS. 5 and 7 through 9, an alternative embodiment 10a of apparatus 10 in accordance with the presently preferred method and apparatus of the present invention is shown, with the apparatus 10a of FIG. 5 being capable of providing mutliple focal points so as to enable different visual effects in which two different things can mingle together in a variable multiple image visual effect. In the arrangement of FIG. 5, which is a fragmentary view of the apparatus 10a, the arrangement is similar to that previously described with reference to FIGS. 1 to 3 and 6, with the exception that two different pluralities of angled planar specular reflective surfaces, labeled A and B in FIG. 5 are interspersed, with each group A and B of reflective surfaces 12 having a different common focal point such as, by way of example, the group of reflective surfaces labeled A having a common focal point F1 given reference numeral 16a and with the group of reflective surfaces labeled B having a common focal point F2 given reference 16b so that, in effect, two pseudo spherical optical arrays are essentially provided with the two focal points 16a and 16b being disposed along a common orthogonal axis 40 parallel to the x axis through the array centers in this example, although it could also be in the y direction if desired. The mounting block 21 for use with the apparatus 10a of FIG. 5 is preferably identical to that previously described with reference to FIG. 1 as is the balance of the structure, with the primary difference being that the reflective surfaces 12 of group A are angled so as to have a common focal point 16a and the reflective surfaces of group B are angled so as to have a common focal point 16b. The reflective surfaces of groups A and B may be interspersed in several different arrangements depending on the desired visual effect, such as a checkerboard type arrangement illustrated in FIGS. 5 and 7, a horozontal stripe type pattern illustrated in FIG. 8 or a vertical stripe type pattern illustrated in FIG. 9. In the double focal point array of FIGS. 5, 7, 8 or 9, an observer at focal point 16a would see his or her reflection in every other mirror for the arrangement of FIGS. 5 or 7, and in the mirrors of the other group, a repeated image of whatever was located at focal point 16b would be seen, such as another person's face or a necktie or a handkerchief by way of example. The multiple reflections would become interwoven and more abstract in this manner than is possible through the use of a single focal point arrangement such as the embodiment of FIGS. 1 through 3. Of course, although the example of FIGS. 5-9 shows a rectangular surface, the array could be composed of other shaped surfaces such as the hexagonal or triangular surfaces of FIGS. 4a and 4b.

Thus, by utilizing the method and apparatus of the present invention, such as by variably disposing an object to be reflected in the array orthogonally along an axis extending through one or more focal points, progressively shifted multiple images may be provided from an object or may be intermingled in the multiple focal point arrangement, as the object shifts orthogonally from the focal point along the axis.

What is claimed is:

1. A visual display apparatus for providing a variable multiple image visual effect comprising:
    a first plurality of planar specular reflective surfaces disposed in a pseudo spherical optical array, said array having a first common center of curvature associated with said first plurality of reflective surfaces and an array center, each of said specular reflective surfaces having a center disposed normal to a radius emanating from said first common center of curvature, whereby each of said planar specular reflective surfaces is disposed tangent to the pseudo spherical optical array pseudo spherical surface, said pseudo spherical optical array having a focal point disposed at said first common center of curvature; and a mounting means for each of said plurality of specular reflective surfaces, each of said specular reflective surfaces being mounted in said array for providing multiple substantially identical reflected visual images of an object disposed at said focal point in front of said array and progressively shifted images from said object as said object to be reflected shifts orthogonally from said focal point, said array providing a pair of orthogonally displaced conjugate foci for said orthogonally shifted object, said pair of conjugate foci being symmetrically displaced from said focal point, said focal point being substantially disposed at the height of said array center, said array center being substantialy disposed at eye level, whereby a multiple image spherical reflector visual effect capable of providing multiple progressively related reflected visual images of an object in said array is provided from a plurality of planar reflective surfaces.

2. A visual display apparatus in accordance with claim 1 wherein said focal point is disposed at a distance R from said array center, said center of a given specular reflective surface being disposed at a distance r from said array center in said pseudo spherical optical array, and the visual angle $\theta$ between a line from said focal point to said given specular reflective surface center and a line from said focal point to said array center is defined by the expression $\theta = \tan^{-1} r/R$.

3. A visual display apparatus in accordance with claim 2 wherein said mounting means for said plurality of planar specular reflective surfaces are disposed in a common plane, with said reflective surfaces associated therewith being angled from said common plane for providing said pseudo spherical optical array.

4. A visual display apparatus in accordance with claim 2 wherein the position of any one of said given specular reflective surfaces in said array is defined by the linear x,y orthogonal translation of said mounted reflective surface center from said array center in said common plane, with r being defined by the expression $r = \sqrt{x^2 + y^2}$.

5. A visual display apparatus in accordance with claim 1 wherein said mounting means for said plurality of planar specular reflective surfaces are disposed in a common plane, with said reflective surfaces associated therewith being angled from said common plane for providing said pseudo spherical optical array.

6. A visual display apparatus in accordance with claim 5 wherein the position of any one of said given specular reflective surfaces in said array is defined by the linear x,y othogonal translation of said mounted reflective surface center from said array center in said common plane, said center of a given specular reflective surface is disposed at a distance r from said array center in said pseudo spherical optical array, with r being defined by the expression $r = \sqrt{x^2 + y^2}$.

7. A visual display apparatus for providing a variable multiple image visual effect comprising:
    a first plurality of planar specular reflective surfaces disposed in a pseudo spherical optical array, said array having a first common center of curvature associated with said first plurality of reflective surfaces and an array center, each of said specular reflective surfaces having a center disposed normal to a radius emanating from said first common center of curvature, whereby each of said planar specular reflective surfaces is disposed tangent to the pseudo spherical optical array pseudo spherical surface, said pseudo spherical optical array having a focal point disposed at said first common center of curvature;
    and a mounting means for each of said plurality of specular reflective surfaces, each of said specular reflective surfaces being mounted in said array for providing multiple substantially identical reflected visual images of an object disposed at said focal point in front of said array and progressively shifted images from said object as said object to be reflected shifts orthogonally from said focal point, said array providing a pair of orthogonally displaced conjugate foci for said orthogonally shifted object, said pair of conjugate foci being symmetrically displaced from said focal point, said focal point being substantially disposed at the height of said array center, said array center being substantially disposed at eye level, whereby a multiple image spherical reflector visual effect capable of providing multiple progressively related reflected visual images of an object in said array is provided from a plurality of planar reflective surfaces; and
    a second plurality of planar specular reflective surfaces disposed in said pseudo spherical optical array, said array having a second common center of curvature associated with said second plurality of specular reflective surfaces and a second array center, said second common center of curvature being orthogonally displaced in the same plane from said first common center of curvature and being disposed for providing a different focal point for said array at each of said centers of curvature, whereby multiple focal points for said array are provided.

8. A visual display apparatus in accordance with claim 7 wherein said first and second plurality of reflective surfaces are interspersed in said array.

9. A visual display apparatus in accordance with claim 8 wherein said interspersed reflective surfaces are disposed in a checkerboard type pattern.

10. A visual display apparatus in accordance with claim 8 wherein said interspersed reflective surfaces are disposed in a horizontal stripe type pattern.

11. A visual display apparatus in accordance with claim 8 wherein said interspersed reflective surfaces are disposed in a vertical stripe type pattern.

12. A visual display apparatus in accordance with claim 7 wherein said mounting means for said plurality of planar specular reflective surfaces are disposed in a common plane with said reflective surfaces associated therewith being angled from said common plane for providing said pseudo spherical optical array.

13. A visual display apparatus in accordance with claim 7 wherein said reflective surfaces are hexagonal.

14. A visual display apparatus in accordance with claim 7 wherein said reflective surfaces are triangular.

15. A visual display apparatus in accordance with claim 7 wherein said reflective surfaces are rectangular.

16. A visual display apparatus in accordance with claim 1 wherein said reflective surfaces are hexagonal.

17. A visual display apparatus in accordance with claim 1 wherein said reflective surfaces are triangular.

18. A visual display apparatus in accordance with claim 1 wherein said reflective surfaces are rectangular.

19. A method of providing a variable multiple image visual effect comprising the steps of:
disposing a first plurality of angled planar specular reflective surfaces in a pseudo spherical optical array having an array center and a first common center of curvature associated with said first plurality of reflective surfaces, each of said specular reflective surfaces having a center disposed normal to a radius emanating from said first common center of curvature, whereby each of said planar specular reflective surfaces is disposed tangent to the pseudo spherical optical array pseudo spherical surface, said disposed pseudo spherical optical array having a focal point disposed at said first common center of curvature; and variably disposing an object to be reflected in said array orthogonally along an axis extending through said focal point for providing progressively shifted multiple images from said object as said object shifts orthogonally from said focal point along said axis, said array providing a pair of orthogonally displaced conjugate foci for said orthogonally shifted object.

20. A method in accordance with claim 19 wherein said pair of conjugate foci are symmetrically displaced from said focal point, said focal point being substantially disposed at the height of said array center, said array center being substantially disposed at eye level.

21. A method in accordance with claim 20 wherein said reflective surface disposing step comprises the step of angling said first plurality of planar reflective surfaces from a common plane at a plurality of predetermined angles for providing said common focal point for said first plurality of reflective surfaces in said pseudo spherical optical array.

22. A method in accordance with claim 21 wherein said reflective surface disposing step further comprises the step of orthogonally positioning said angled reflective surfaces in said array.

23. A method in accordance with claim 19 wherein said reflective surface disposing step comprises the step of angling said first plurality of planar reflective surfaces from a common plane at a plurality of predetermined angles for providing said common focal point for said first plurality of reflective surfaces in said pseudo spherical optical array.

24. A method in accordance with claim 23 wherein said reflective surface disposing step further comprises the step of orthogonally positioning said angled reflective surfaces in said array.

25. A method in accordance with claim 19 wherein said reflective surface disposing step further comprises the step of disposing a second plurality of angled planar specular reflective surfaces interspersed in said pseudo optical array with said first plurality of reflective surfaces, said array having a second common center of curvature associated with said second plurality of reflective surfaces and being orthogonally displaced in the same plane from said first common center of curvature, whereby multiple orthogonally displaced focal points along said axis are provided.

26. A method in accordance with claim 25 wherein said interspersing step comprises interspersing said first and second plurality of reflective surfaces in a checkerboard type pattern.

27. A method in accordance with claim 25 wherein said interspersing step comprises interspersing said first and second plurality of reflective surfaces in a horizontal stripe type pattern.

28. A method in accordance with claim 25 wherein said interspersing step comprises interspersing said first and second plurality of reflective surfaces in a vertical stripe type pattern.

29. A visual display apparatus in accordance with claim 7, wherein said focal points are disposed at a distance R from their respective array centers, said center of each of said given specular reflective surface being disposed at a distance r from its respective array center in said pseudo spherical optical array, and the visual angles $\phi$ between lines from said focal points to said given specular reflective surface centers and lines from said focal points to said array centers are defined by the expression $\phi = \tan^{-1} r/R$.

30. A visual display apparatus in accordance with claim 29, wherein said mounting means for said plurality of planar specular reflective surfaces are disposed in a common plane, with said reflective surfaces associated therewith being angled from said common plane for providing said pseudo spherical optical array.

31. A visual display apparatus in accordance with claim 29, wherein the position of any one of said given specular reflective surfaces in said array is defined by the linear x,y orthogonal translation of said mounted reflective surface center from its respective array center in said common plane, with r being defined by the expression $r = \sqrt{x^2 + y^2}$.

32. A visual display apparatus in accordance with claim 7, wherein said mounting means for said plurality of planar specular reflective surfaces are disposed in a common plane, with said reflective surfaces associated therewith being angled from said common plane for providing said pseudo spherical optical array.

33. A visual display apparatus in accordance with claim 32, wherein the position of any one of said given specular reflective surfaces in said array is defined by the linear x,y orthogonal translation of said mounted reflective surface center from its respective array center in said common plane, said center of a given specular reflective surface is disposed at a distance r from its respective array center in said pseudo spherical optical array, with r being defined by the expression $r = \sqrt{x^2 + y^2}$.

* * * * *